(12) United States Patent
Hatano

(10) Patent No.: US 7,937,074 B2
(45) Date of Patent: May 3, 2011

(54) INFORMATION TERMINAL, AND EVENT NOTIFYING METHOD

(75) Inventor: Kouji Hatano, Tokyo (JP)

(73) Assignee: Panasonic Corporation, Osaka (JP)

( * ) Notice: Subject to any disclaimer, the term of this patent is extended or adjusted under 35 U.S.C. 154(b) by 26 days.

(21) Appl. No.: 10/599,000

(22) PCT Filed: Jun. 28, 2005

(86) PCT No.: PCT/JP2005/011839
§ 371 (c)(1),
(2), (4) Date: Sep. 18, 2006

(87) PCT Pub. No.: WO2006/022075
PCT Pub. Date: Mar. 2, 2006

(65) Prior Publication Data
US 2007/0190979 A1   Aug. 16, 2007

(30) Foreign Application Priority Data

Aug. 27, 2004   (JP) ................................. 2004-247930

(51) Int. Cl.
*H04M 3/00* (2006.01)
*H04M 1/00* (2006.01)
*H04N 7/14* (2006.01)

(52) U.S. Cl. ................... 455/418; 379/373.01; 379/418; 348/14.02

(58) Field of Classification Search ................ 455/412.2, 455/418, 412, 414; 348/14.01–14.16; 725/62; 709/201–244; 379/373.01, 418
See application file for complete search history.

(56) References Cited

U.S. PATENT DOCUMENTS

| | | | |
|---|---|---|---|
| 5,890,071 A | | 3/1999 | Shimanuki |
| 6,771,323 B1 * | | 8/2004 | Dean et al. ..................... 348/722 |
| 6,819,939 B2 * | | 11/2004 | Masamura ................. 455/550.1 |
| 2002/0045438 A1 * | | 4/2002 | Tagawa et al. ................ 455/412 |
| 2004/0007120 A1 * | | 1/2004 | Futamase et al. ............... 84/622 |
| 2004/0105532 A1 | | 6/2004 | Nakano |
| 2007/0054615 A1 * | | 3/2007 | Marshall et al. ............. 455/3.06 |
| 2007/0198650 A1 * | | 8/2007 | Hameleers et al. ........... 709/217 |

FOREIGN PATENT DOCUMENTS

| | | |
|---|---|---|
| EP | 1396984 A | 3/2004 |
| JP | 8-125723 | 5/1996 |
| JP | 2000-106593 | 4/2000 |
| JP | 2002-199056 | 7/2002 |
| JP | 2002-369257 | 12/2002 |
| JP | 2003-258988 | 9/2003 |
| JP | 2003-304304 | 10/2003 |
| JP | 2004-186716 | 7/2004 |

OTHER PUBLICATIONS

International Search Report dated Oct. 27, 2009.

* cited by examiner

*Primary Examiner* — Kamran Afshar
*Assistant Examiner* — Kathy Wang-Hurst
(74) *Attorney, Agent, or Firm* — Pearne & Gordon LLP

(57) ABSTRACT

An information terminal of the present invention aims at informing the user of an occurrence of an event during the reproduction of contents without an unexpected feeling. An information terminal of the present invention, includes a contents reproducing unit 10 for reproducing contents, a contents reproducing unit 20 for informing an occurrence of an event by reproducing the contents, a superposing unit 70 for superposing respective outputs of the contents reproducing unit 10, 20, and a controlling unit 50 for causing an information of the occurrence of the event and a superposition of respective outputs of the contents reproducing unit 10, 20 to execute in a previously set reproducing procedure.

4 Claims, 16 Drawing Sheets

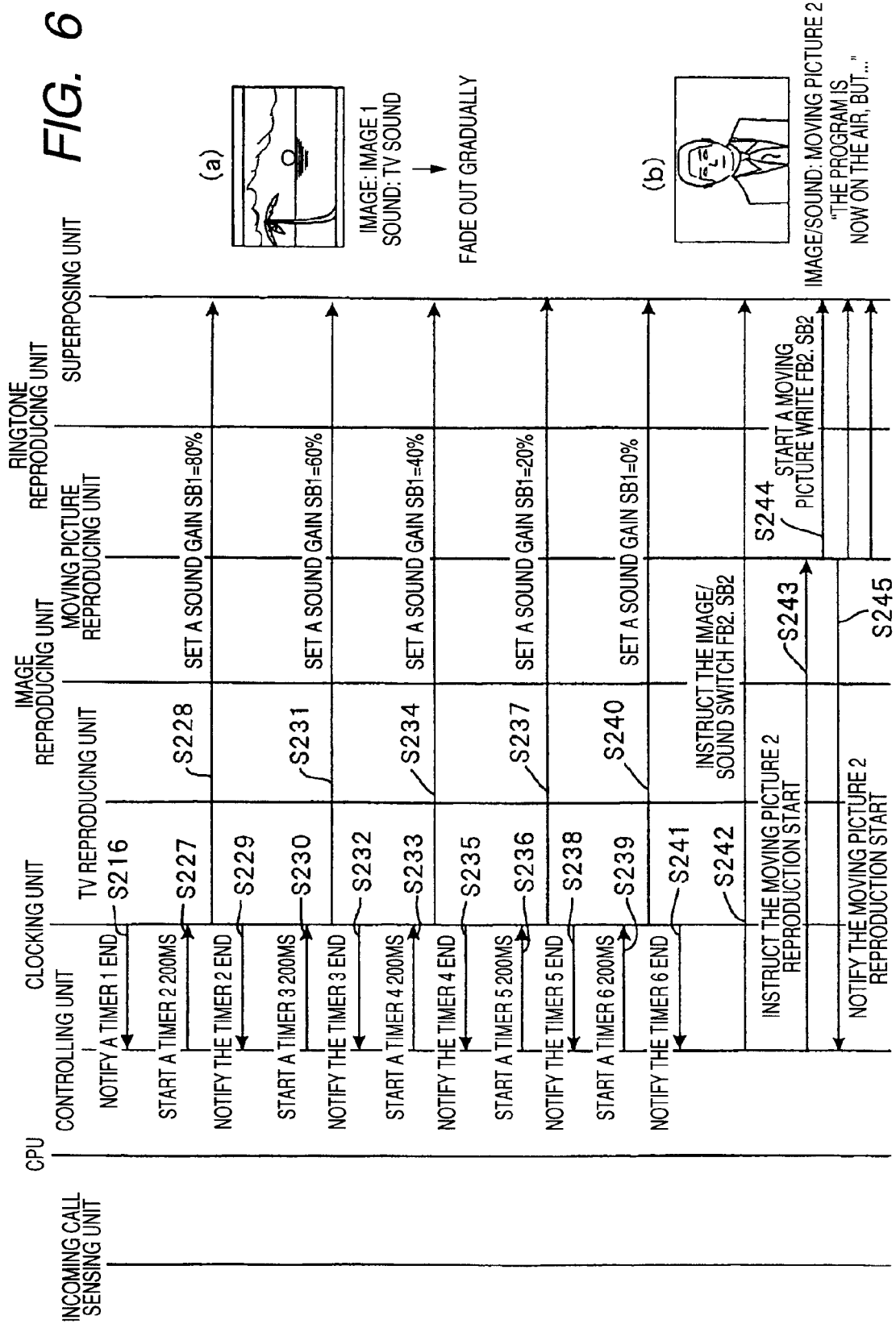

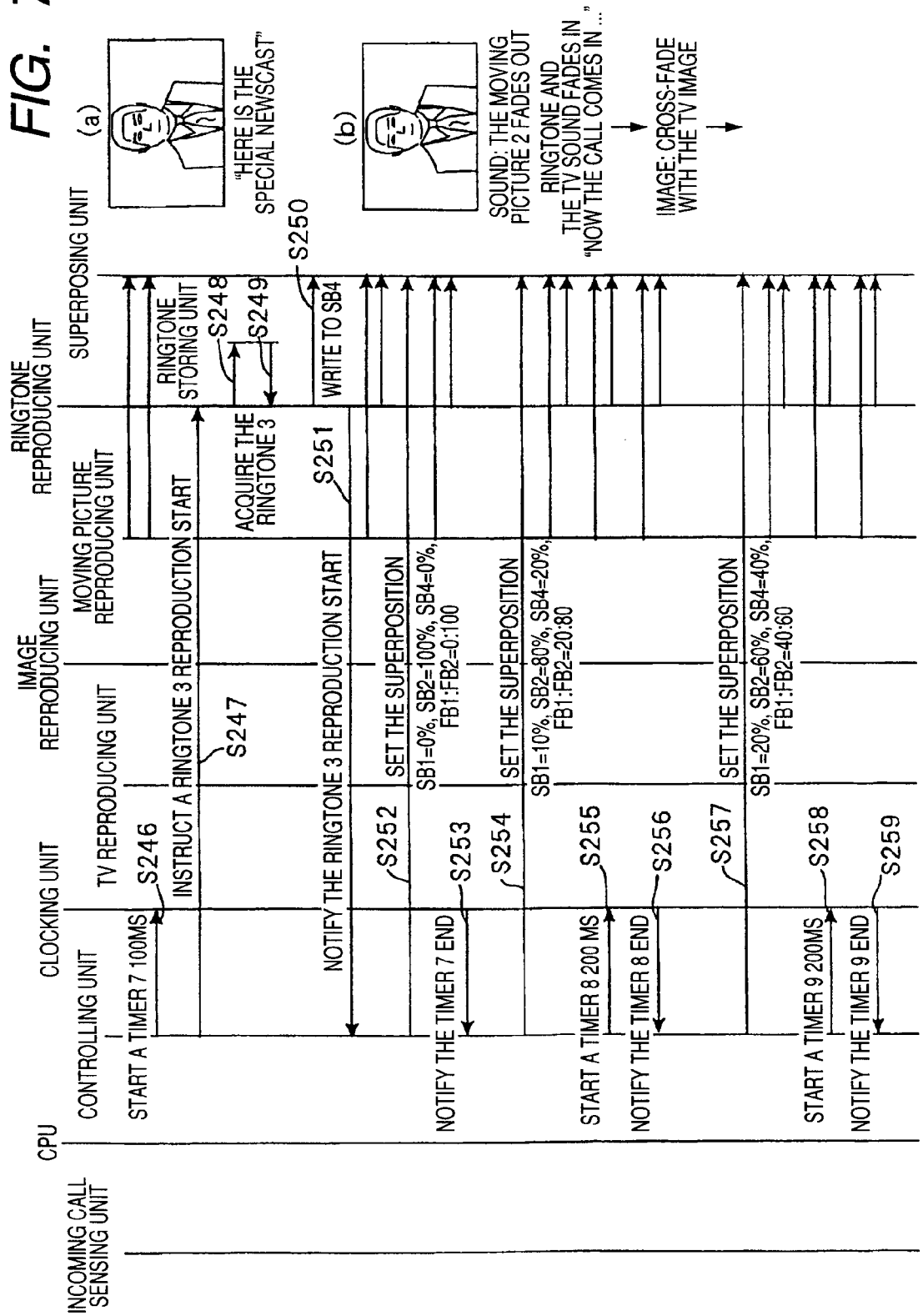

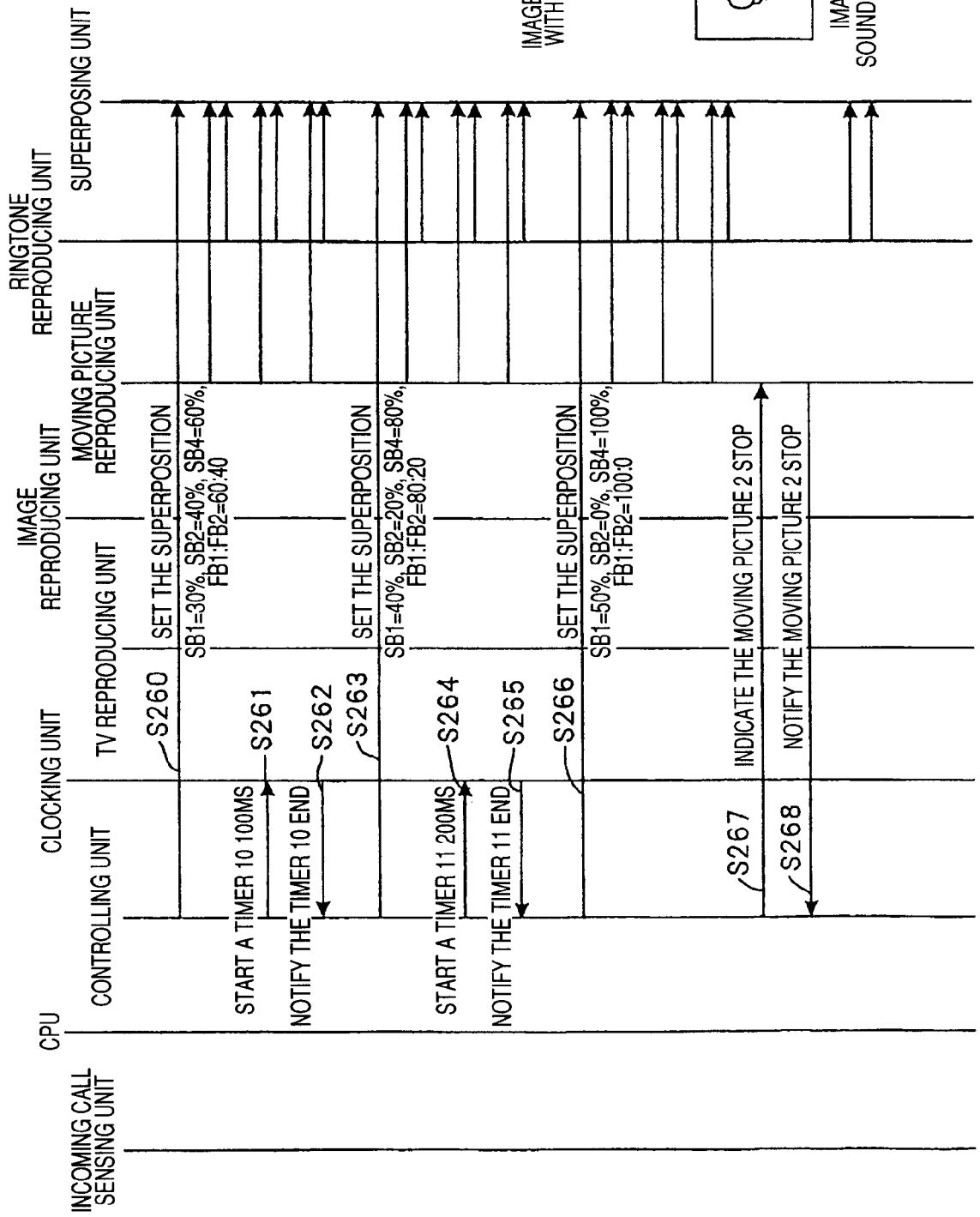

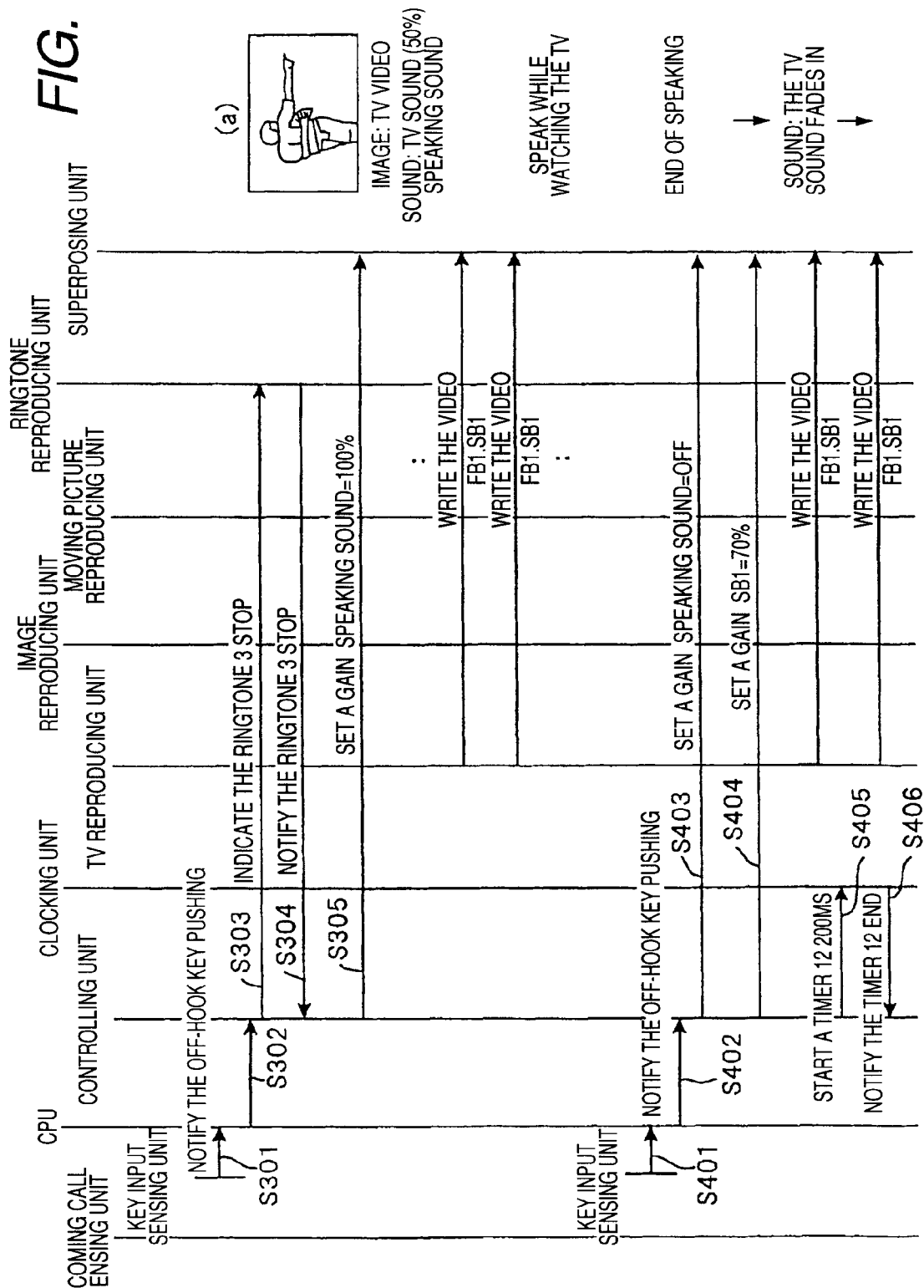

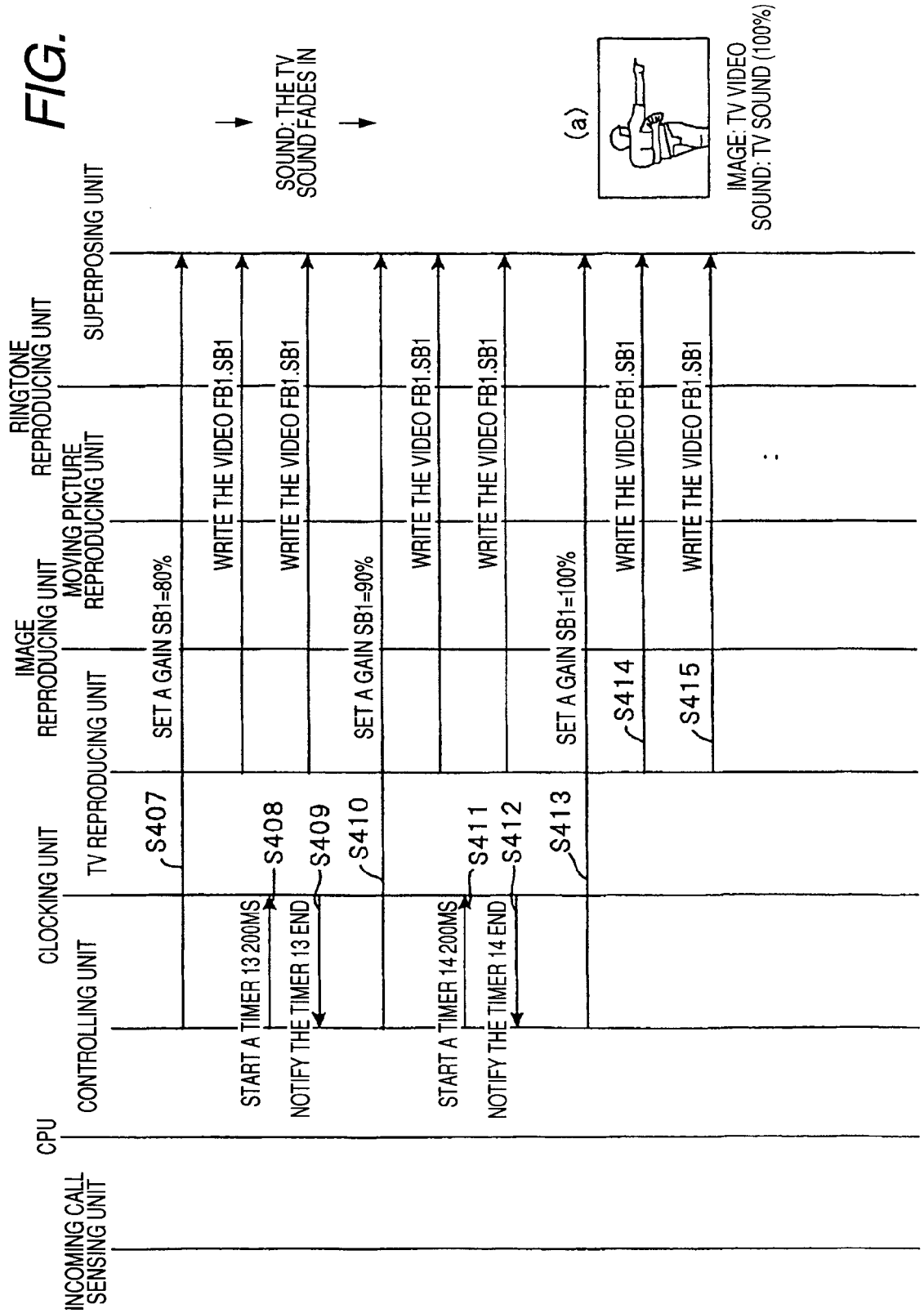

FIG. 11

CHARACTER DATA
(D-DEC OUTPUT)

```
<html>
<head>
<title> night game broadcast </title>
</head>
<boby>
<center>
<img src="sports.jpg"    alt="sports ">
</center>

</body>
</html>
```

FIG. 12

META DATA

```
<title> night game broadcast</title>
<genre>sports</genre>
```

FIG. 13

| GENRE | CONTROL PROCEDURE TABLE NAME |
|---|---|
| music | script_table_music |
| drama | script_table_dorama |
| sports | script_table_sports |
| news | script_table_news |
| : | : |

TABLE NAME=SCRIPT TABLE_SPORTS

| SENDER GROUP | ARRIVAL PERIOD | CONTROLLING UNIT FILE NAME |
|---|---|---|
| FRIEND | 7/1~8/30 | SCRIPT 1 |
|  | 9/1~6/30 | SCRIPT 2 |
| WORK | WHOLE PERIOD | SCRIPT 3 |
| : | : | : |

INFORMATION TERMINAL, AND EVENT NOTIFYING METHOD

TECHNICAL FIELD

The present invention relates to an information terminal having a function of reproducing various contents such as a music, a moving picture, a television broadcast, and the like and, more particularly, an information terminal characterized in that a contents reproducing operation is controlled when an event such as a phone call, or the like takes place while the contents are being reproduced, and a method of informing an event.

BACKGROUND ART

In recent years, on account of a size reduction and a capacity increase of the memory and an improvement in the sound compressing technology, the mobile terminal such as the cellular phone, or the like is also able to reproduce conveniently various contents such as the music, the moving picture, the television broadcast, and the like. In this situation it becomes an important control element to switch an output of an informing sound, or the like and a reproduced output of the contents and adjust the balance between them when the event occurs. For example, the information terminal device, the cellular phone, and the like, which can control adequately these outputs at a time of receiving a call or speaking on the phone, have been proposed (see Patent Literature 1, for example).

Patent Literature 1: JP-A-2003-258988 (Pages 4 to 7, FIG. 1)

DISCLOSURE OF THE INVENTION

Problems that the Invention is to Solve

In the information terminal device disclosed in Patent Literature 1, the balance between a reproducing sound of the contents and a speaking sound is changed into a previously set value at a time of incoming of a phone call. With this information terminal device, the user can speak satisfactorily over the phone while reproducing the audio, for example. However, in the information terminal device in the prior art, since a reduction in a reproduced sound volume of the contents and an increase in a sound volume of the speaking sound are made suddenly when the phone call comes in, for example, the user of the device has an unexpected feeling such that the user is surprised at a sudden change in balance, or the like. Also, the incoming call of the phone made always by the same bell or phone melody irrespective of the type of reproduced contents is the uniform information and lacks its power of expression, and has its poor entertaining faculty.

It is an object of the present invention to provide an information terminal capable of informing the user of an occurrence of an event during the reproduction of contents without an unexpected feeling and a method of informing an event. Also, it is another object of the present invention to provide an information terminal with its high entertaining faculty, capable of informing an occurrence of an event in various ways by its excellent powers of expression and a method of informing an event.

Means for Solving the Problems

An information terminal of the present invention, includes a reproducing unit for reproducing contents; an informing unit for informing an occurrence of an event; a superposing unit for superposing an output of the reproducing unit and an output of the informing unit; and a controlling unit for causing an information of the occurrence of the event and a superposition of the output of the reproducing unit and the output of the informing unit to execute in a previously set reproducing procedure. Also, a method of informing an event that occurs during reproduction of contents, the method causes a superposition of an output of a reproducing unit and a output of an informing unit and an information of an occurrence of an event to execute in a previously set reproducing procedure. According to this configuration, the reproduction of contents and the information of an occurrence of an event are carried out in previously set reproducing procedures. Therefore, it is possible to inform the user of an occurrence of an event during the reproduction of contents without an unexpected feeling.

Also, the information terminal of the present invention further includes a storing unit for storing the reproducing procedure in plural; and an extracting unit for extracting meta information to select the reproducing procedure from the contents; wherein the controlling unit causes the superposition of the output of the reproducing unit and the output of the informing unit and the information of the occurrence of the event to execute in the reproducing procedure selected based on the extracted meta information. Also, the information terminal of the present invention further includes a storing unit for storing the reproducing procedure in plural; and an acquiring unit for acquiring data that is corresponded to the contents; wherein the controlling unit causes the superposition of the output of the reproducing unit and the output of the informing unit and the information of the occurrence of the event to execute in the reproducing procedure selected based on the acquired information. Also, the information terminal of the present invention further includes a storing unit for storing the reproducing procedure in plural; and a sensing unit for sensing a terminal state; wherein the controlling unit causes the superposition of the output of the reproducing unit and the output of the informing unit and the information of the occurrence of the event to execute in the reproducing procedure selected based on the sensed terminal state. Also, in the event informing method of the present invention, a reproducing procedure is selected based on meta information of the contents. Also, in the event informing method of the present invention, a reproducing procedure is selected based on information that is corresponded to the contents. Also, in the event informing method of the present invention, a reproducing procedure is selected based on a terminal state. According to this configuration, the optimum reproducing procedure can be selected from plural reproducing procedures in response to the contents being reproduced. Therefore, it is possible to provide the information terminal with high entertaining faculty, capable of informing an occurrence of an event in various ways by its excellent powers of expression.

Advantages of the Invention

According to the present invention, the reproduction of contents and the information of an occurrence of an event are carried out in previously set reproducing procedures. Therefore, it is feasible to inform the user of the occurrence of the event during the reproduction of contents without an unexpected feeling.

BRIEF DESCRIPTION OF THE DRAWINGS

[FIG. 6] A sequence diagram showing the contents reproduction controlling operation procedure performed when the phone call is sensed during the reproduction of contents, in the information terminal in the embodiment of the present invention.

[FIG. 7] A sequence diagram showing the contents reproduction controlling operation procedure performed when the phone call is sensed during the reproduction of contents, in the information terminal in the embodiment of the present invention.

[FIG. 8] A sequence diagram showing the contents reproduction controlling operation procedure performed when the phone call is sensed during the reproduction of contents, in the information terminal in the embodiment of the present invention.

[FIG. 9] A sequence diagram showing the contents reproduction controlling operation procedure performed when the phone call is sensed during the reproduction of contents, in the information terminal in the embodiment of the present invention.

[FIG. 10] A sequence diagram showing the contents reproduction controlling operation procedure performed when the phone call is sensed during the reproduction of contents, in the information terminal in the embodiment of the present invention.

[FIG. 11] A view showing an example of a description format of the character data inserted into contents data.

[FIG. 12] A view showing an example of a description format of the meta information.

[FIG. 13] A view showing a reference example of a control procedure table.

Figure 1:
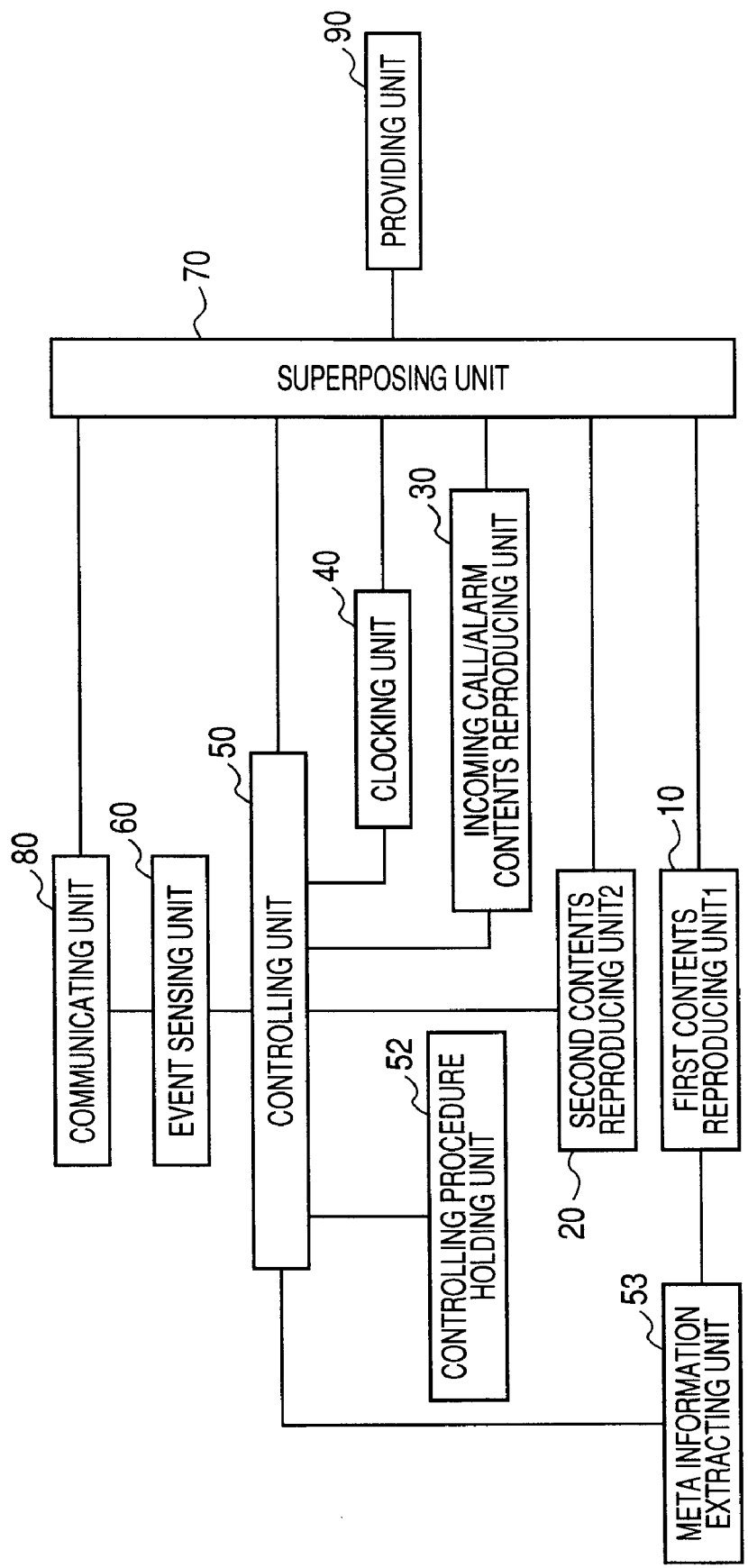
[FIG. 1] A view showing a schematic internal configuration of an information terminal in an embodiment of the present invention.

DESIGNATION OF REFERENCE NUMERALS 10 first contents reproducing unit
11 TV reproducing unit
12 TV tuner
13 demodulating unit
14 antenna
20 second contents reproducing unit
21 moving picture reproducing unit
22 moving picture reading unit
23 moving picture storing unit
25 image reproducing unit
26 image reading unit
27 image storing unit
30 incoming call/alarm contents reproducing unit
31 ringtone reproducing unit
32 ringtone reading unit
33 ringtone storing unit
40 clocking unit
50 controlling unit
51 CPU
52 controlling procedure holding unit
53 meta information extracting unit
54 phone book
55 key input sensing unit
60 event sensing unit
61 incoming call sensing unit
70 superposing unit
80 communicating unit
81 demodulating unit
82 decoder (audio)
83 encoder (audio)
84 modulating unit
90 providing unit
91 LCD
92 head set
101 demultiplexer
102 decoder (audio)
103 sound buffer
104 decoder (video)
105 frame buffer
106 decoder (data)
201 demultiplexer
202 decoder (audio)
203 sound buffer
204 decoder (video)
205 frame buffer
206 decoder (image)
207 frame buffer
301 sound buffer

BEST MODE FOR CARRYING OUT THE INVENTION

An information terminal according to an embodiment of the present invention will be explained with reference to the accompanying drawings hereinafter. The same reference symbols are affixed to the elements having the same function throughout all figures used to explain the embodiment, and their redundant explanation will not be repeated herein.

FIG. 1 is a view showing a schematic internal configuration of an information terminal in an embodiment of the present invention. The information terminal includes a first contents reproducing unit 10, a second contents reproducing unit 20, an incoming call/alarm contents reproducing unit 30, a clocking unit 40, a controlling unit 50, an event sensing unit 60, a superposing unit 70, a communicating unit 80, and an providing unit 90.

The first contents reproducing unit 10 is a portion for reproducing audio-visual contents such as the music, movie, TV, and the like, and includes a decoder, a television tuner, and the like used for coded/compressed data. The second contents reproducing unit 20 is a portion for reproducing informing contents that are different from incoming call/alarm informing contents described later. The incoming call/alarm contents reproducing unit 30 is a reproducing portion for informing the user of the information terminal of the incoming call/alarm, and reproduces sequence sound, audio, moving picture, animation, and the like. The clocking unit 40 measures a time, and informs the controlling unit 50 and the superposing unit 70 of time information regarding the reproduction of the contents.

The controlling unit 50 supervises/controls the overall operation of the information terminal concerning the sensing/informing event such as a control regarding the play/stop of contents, operation controls (timing, superposing parameter, pointing of the type of superposition, etc.) of the superposing unit 70, and the like. The controlling unit 50 is connected to a controlling procedure holding unit 52, and a meta information extracting unit 53. The controlling procedure holding unit 52 stores plural pieces of scenario information that describe reproducing procedures of the contents reproduction and the event information. The meta information extracting unit 53 extracts the meta information, which is used to designate one of scenario information stored in the controlling procedure holding unit 52, from the contents data that is being reproduced by the first contents reproducing unit 10.

The event sensing unit 60 senses an event such as a phone call, an alarm, or the like and then informs the controlling unit 50 of the event. The superposing unit 70 superposes visually and acoustically outputs of the first contents reproducing unit 10 and the second contents reproducing unit 20, an output of the incoming call/alarm contents reproducing unit 30, and the speaking sound.

The communicating unit 80 acts as a radio communication unit for controlling an outgoing call and an incoming call of the phone in the information terminal, and holds a communication with a radio base station constituting the public radio telephone network to transmit/receive the phone conversation, the electronic mail, and the like. Here, the publicly known approach may be employed in the radio communication and therefore explanation about the detailed inner configuration of the communicating unit 80 and respective functions implemented by this communicating unit will be omitted herein. The providing unit 90 provides the superposed reproduced output to the user of the information terminal via a display like LCD, a speaker, or the like.

Figure 2:
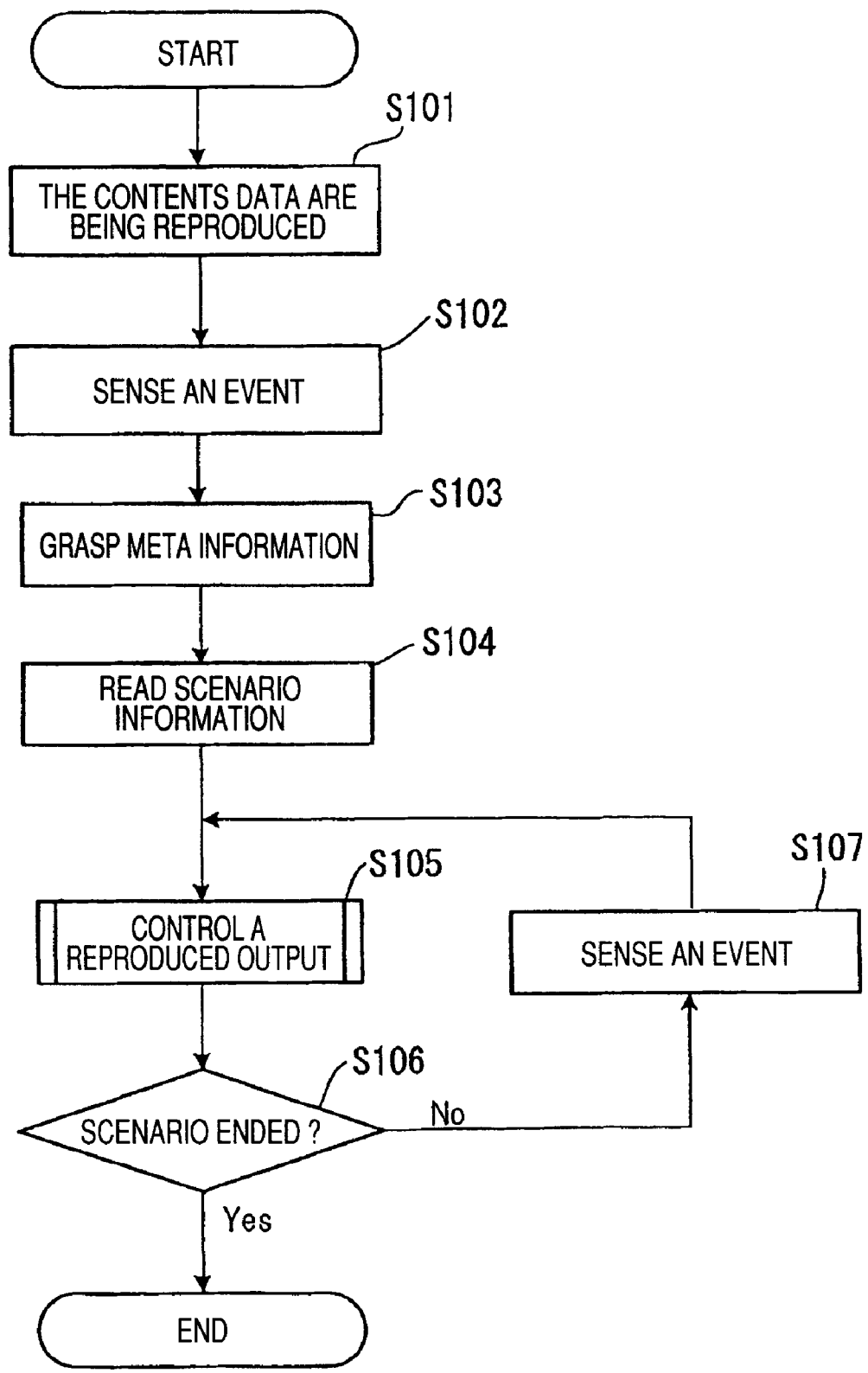
[FIG. 2] A flowchart showing the controlling operation procedure performed when an event is sensed during the reproduction of contents, in the information terminal in the embodiment of the present invention.

FIG. 2 is a flowchart showing the controlling operation procedure performed when an event is sensed during the reproduction of contents, in the information terminal in the embodiment of the present invention. At first, while the contents data are being reproduced by the first contents reproducing unit 10 (step S101), the event sensing unit 60 senses the event such as a phone call, an alarm, or the like (step S102). Then, the controlling unit 50 grasps the meta information that the meta information extracting unit 53 extracts from the contents data being reproduced at that time (step S103). The meta information contains type of the contents being reproduced, information indicating the scenario information, and the like. Therefore, the controlling unit 50 selects the scenario information based on the meta information, and reads the designated scenario information from the controlling procedure holding unit 52 (step S104). For example, when the contents being reproduced at that time corresponds to the sports broadcast of the TV broadcast, the scenario information corresponding to the meta information "sports broadcast" of the contents is selected.

The controlling unit 50 controls the superposition of the output of the first contents reproducing unit 10 and the output of the second contents reproducing unit 20 in time series based on the read scenario information and time information acquired from the clocking unit 40 (step S105). For instance, the controlling unit fades out the output of the first contents reproducing unit 10 and also fades in the output of the second contents reproducing unit 20 in parallel.

Then, before the scenario is ended (step S106), the event sensing unit 60 senses the event, for example, the phone conversation initiated by the phone call is ended, or the like (step S107). Then, the controlling unit 50 controls again the superposition of the output of the first contents reproducing unit 10 and the output of the second contents reproducing unit 20 in time series to restore the first and second contents reproducing unit into their original contents reproducing states (step S105). In this case, particular examples of "control a reproduced output" in step S105 will be explained in detail in Examples later.

In this manner, when the event is sensed, the superposition of the reproduced output of the first contents reproducing unit and the reproduced output of the second contents reproducing unit is changed gradually. Therefore, it is possible to inform the user of the occurrence of the event without an unexpected feeling. Also, the event information whose powers of expression is excellent and whose entertaining faculty is high can be attained by selecting the optimum scenario information based on the meta information of the contents being reproduced.

Next, an internal configuration of the information terminal, into which a TV reproducing unit as an example of the first contents reproducing unit 10 in FIG. 1 and an incoming call sensing unit of the phone as an example of the event sensing unit 60 are installed, and its reproduced output controlling operation taken when the phone call comes in during the reproduction of contents will be explained concretely hereunder.

Figure 3:
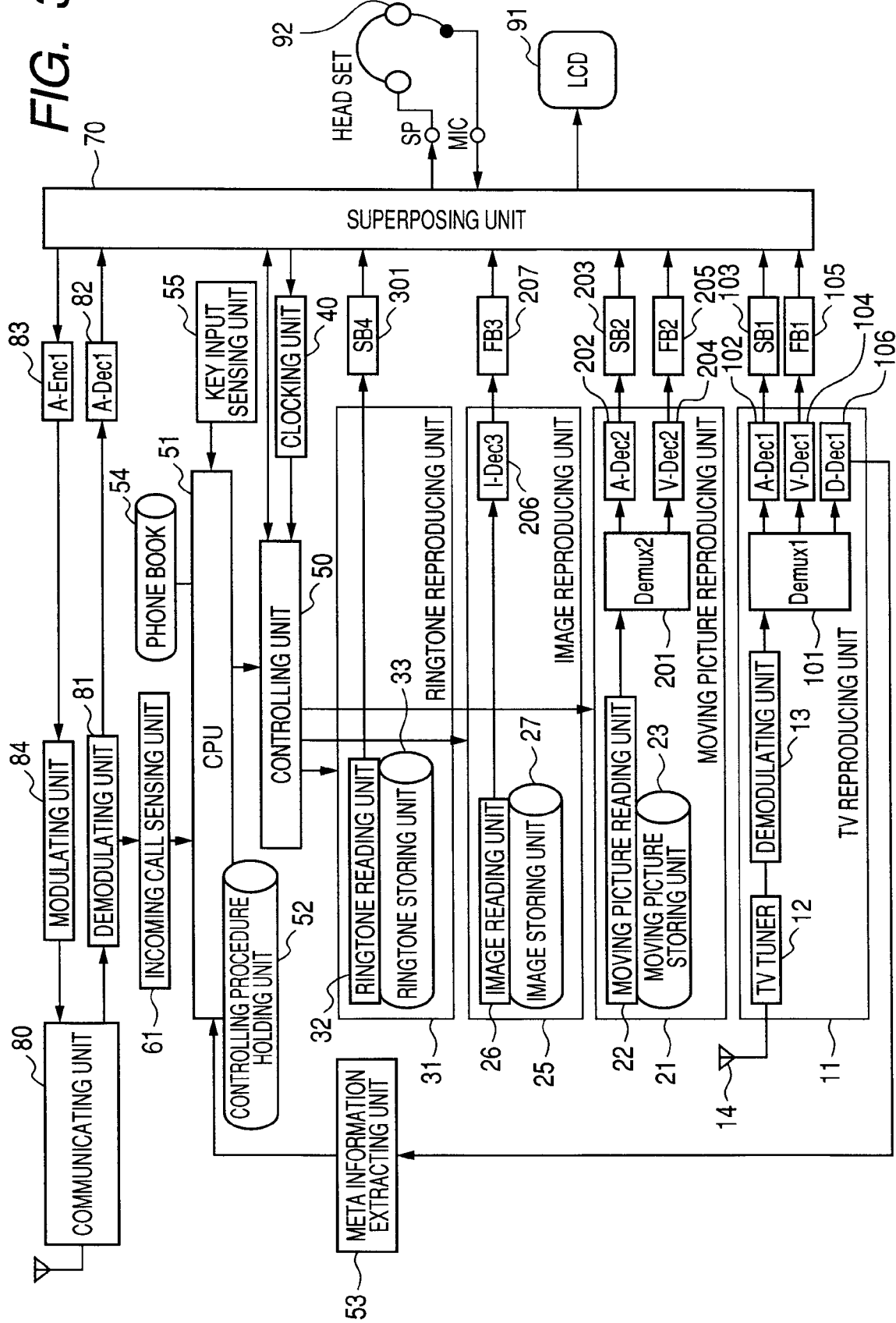
[FIG. 3] A view showing a detailed internal configuration of the information terminal in the embodiment of the present invention.
Figure 4:
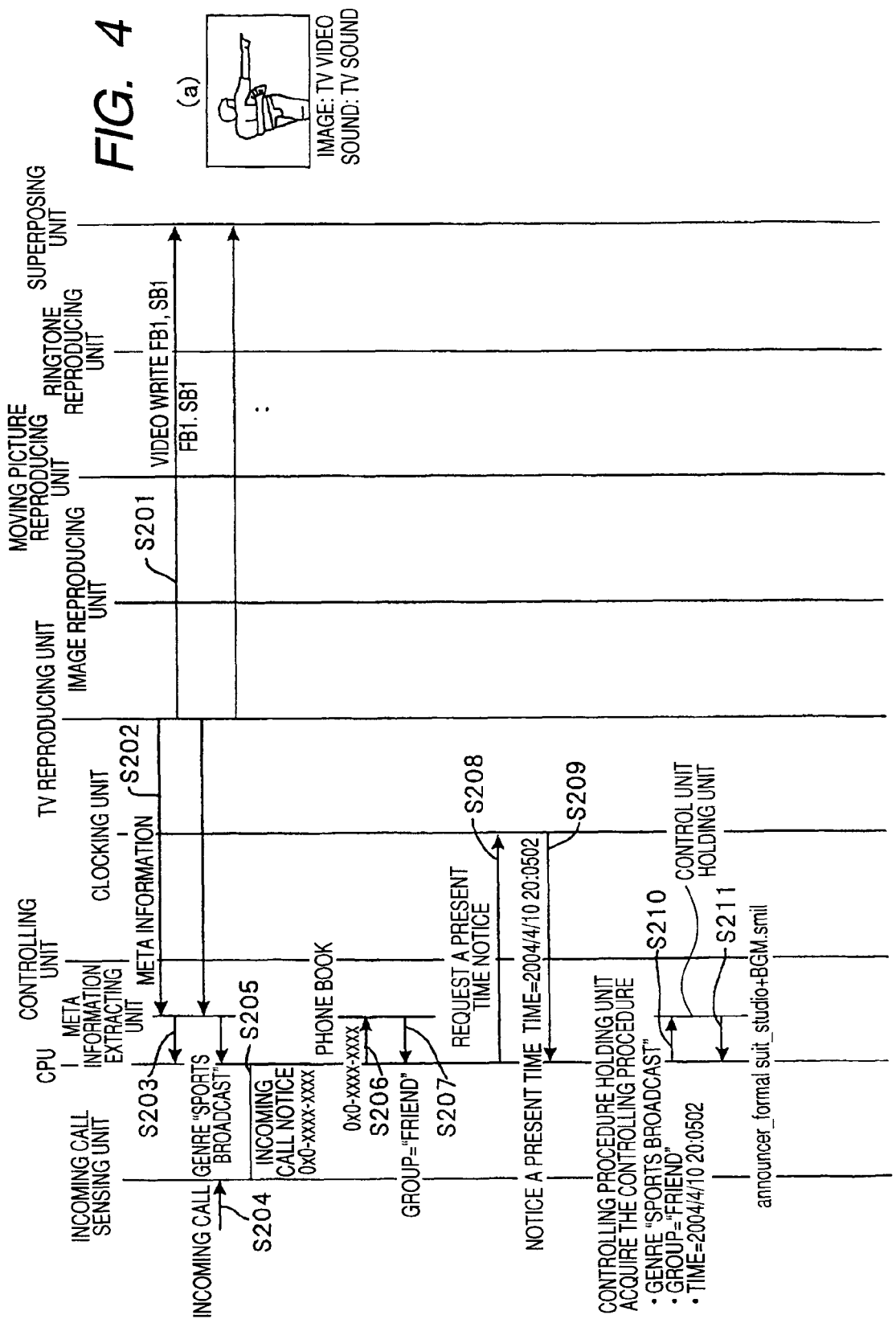
[FIG. 4] A sequence diagram showing the contents reproduction controlling operation procedure performed when a phone call is sensed during the reproduction of contents, in the information terminal in the embodiment of the present invention.

FIG. 3 is a view showing an internal configuration of a cellular phone terminal in the embodiment of the present invention. The cellular phone terminal includes a TV reproducing unit 11, a moving picture reproducing unit 21, an image reproducing unit 25, a ringtone reproducing unit 31, a clocking unit 40, a controlling unit 50, an incoming call sensing unit 61, a superposing unit 70, a communicating unit 80, an LCD 91, and a head set 92.

The TV reproducing unit 11 is an example of the first contents reproducing unit 10 in FIG. 1, and is configured by a TV tuner 12, a demodulating unit 13, an antenna 14, and the like. The TV tuner 12 receives a radio wave of the TV broadcast via the antenna 14, and the demodulating unit 13 demodulates a received radio wave. The TV reproducing unit 11 causes a demultiplexer 101 to demultiplex the demodulated stream and then causes audio, video, and data decoders to decode demultiplexed signals respectively. The decoded audio and video data are output to the superposing unit 70 described later via buffers. The data decoded by the data decoder 106 are output to a meta information extracting unit 53 described later.

The moving picture reproducing unit 21 and the image reproducing unit 25 are given as an example of the second contents reproducing unit 20 in FIG. 1. The moving picture reproducing unit 21 is configured by a moving picture reading unit 22, a moving picture storing unit 23, and the like, and the image reproducing unit 25 is configured by an image reading unit 26, an image storing unit 27, and the like. The moving picture reproducing unit 21 causes a demultiplexer 201 to demultiplex the moving picture that the moving picture reading unit 22 reads from the moving picture storing unit 23 and output the demultiplexed moving picture to the superposing unit 70 described later via buffers. The image reproducing unit 25 causes a decoder 206 to decode the image data that image reading unit 26 reads from the image storing unit 27 and output the demultiplexed moving picture to the superposing unit 70 described later via a buffer.

The ringtone reproducing unit 31 is given as an example of the incoming call/alarm contents reproducing unit 30 in FIG. 1. This ringtone reproducing unit is configured by a ringtone reading unit 32, a ringtone storing unit 33, and the like, and executes the reproduction of the ringtone when the phone call comes in. The ringtone data that the ringtone reading unit 32 reads from the ringtone storing unit 33 are output to the superposing unit 70 described later via a buffer.

The clocking unit 40 and the controlling unit 50 have the same function as the clocking unit and the controlling unit in FIG. 1 respectively. The controlling unit 50 is realized through software by a control program executed by a CPU 51. Also, the controlling procedure holding unit 52 and the meta information extracting unit 53 are connected to the controlling unit 50.

The incoming call sensing unit 61 is given as an example of the event sensing unit 60 in FIG. 1, and senses the incoming call of the phone herein.

The superposing unit 70 and the communicating unit 80 have the same function as the superposing unit and the communicating unit in FIG. 1 respectively. A demodulating unit 81, an audio decoder 82, an audio encoder 83 and a modulating unit 84 are provided between the communicating unit 80 and the superposing unit 70.

The LCD 91 and the head set 92 are given as an example of the providing unit 90 in FIG. 1. The LCD 91 displays the image of the contents superposed by the superposing unit 70, and the like. Also, the head set 92 outputs the sound of the contents superposed by the superposing unit 70, and the like from a speaker portion. As a result, the user of the information terminal can view and listen the informing contents, and the like via the screen of the LCD 91 and the sound output of the head set 92.

FIG. 4 to FIG. 10 are sequence diagrams showing the contents reproduction controlling operation procedures performed when a phone call is sensed during the reproduction of contents, in the information terminal in the embodiment of the present invention. At first, the TV reproducing unit 11 outputs periodically the stream data of the received TV broadcast to the buffers connected to the superposing unit 70 while the user of this information terminal is viewing the TV broadcast (step S201). Also, the meta information extracting unit 53 extracts periodically the meta information from character data of the received TV broadcast reception data (step S202), and informs the meta information of the CPU 51 (step S203). FIG. 11 is a view showing an example of a description format of the character data inserted into contents data (i.e., TV broadcast reception data in the present embodiment). The meta information extracting unit 53 extracts the meta information from the character data. FIG. 12 is a view showing an example of a description format of the meta information. In FIG. 12, since the user is looking and listening the night game broadcast program, the meta information in the genre "sports" is extracted.

When the incoming call sensing unit 61 senses the phone call via the communicating unit 80 during the reproduction of the television broadcast (step S204), it issues the incoming call notice to the CPU 51 (step S205). The CPU 51 looks up phone number data stored in the phone book 54 (step S206), and grasps that the phone call is issued from the sender who belongs to the "friend" group (step S207).

The CPU 51 requests the clocking unit 40 to inform present time information (step S208), and acquires the present time information (step S209). Then, the CPU 51 accesses the controlling procedure holding unit 52 (step S210), and searches and acquires the appropriate scenario information (step S211). As the search conditions in this case, the genre is "sports", the sender group is "friend", and the present time is "Oct. 4, 2004 20:0502", and the different scenario information is selected according to the search conditions.

In more detail, since the controlling procedure holding unit 52 holds a control procedure table that correlates the search conditions with the scenario information uniquely, the scenario information can be searched by looking up this table. FIG. 13 is a view showing a reference example of the control procedure table. For example, when the genre of the extracted meta information "sports broadcast" is "sports", a table "script table_sports" is referred to. In this table, the scenario information are classified under the search items of the sender group and the arrival period. Therefore, it is understood that in this case a "script 2" is selected as the appropriate scenario information.

Figure 5:
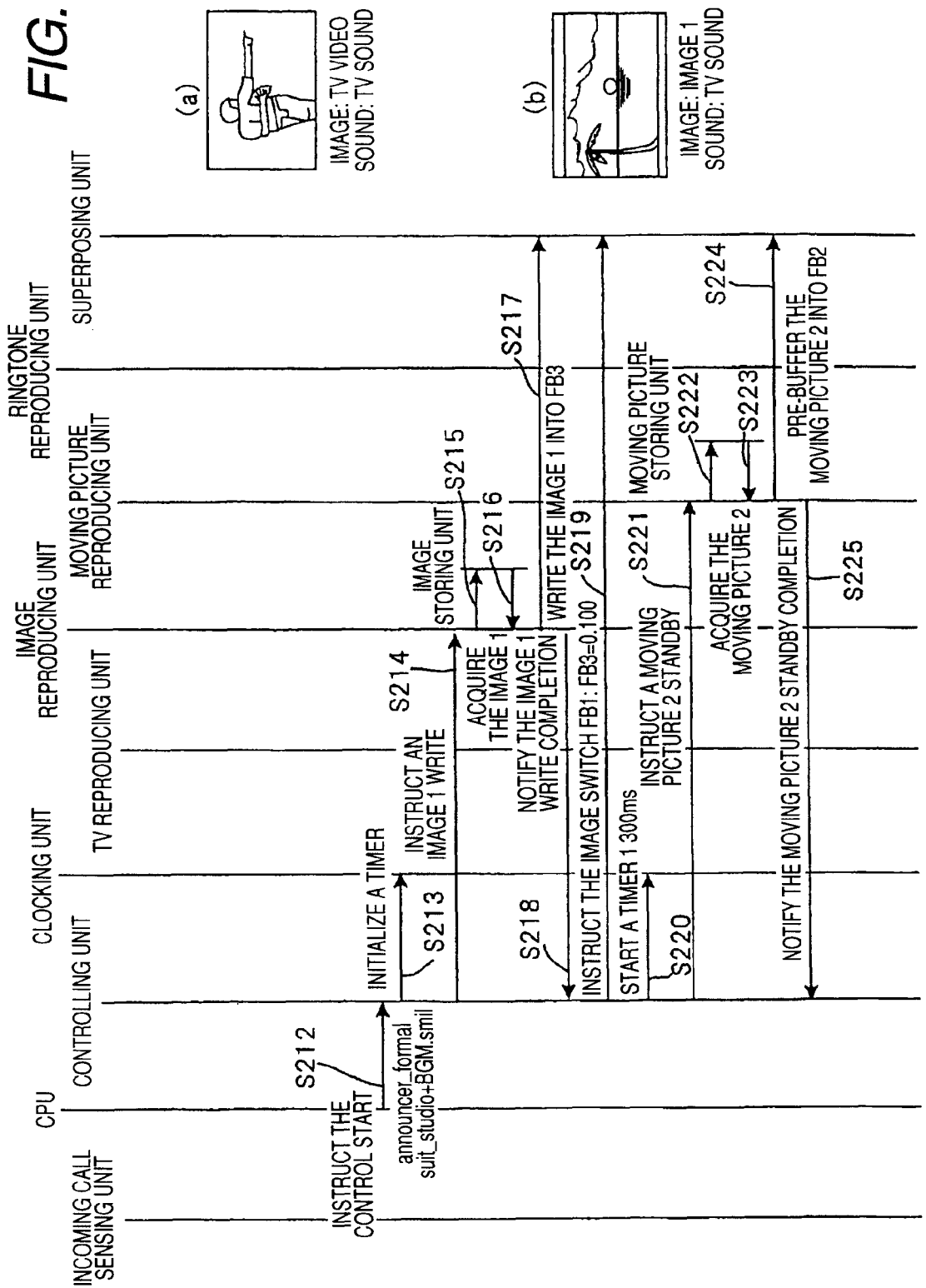
[FIG. 5] A sequence diagram showing the contents reproduction controlling operation procedure performed when the phone call is sensed during the reproduction of contents, in the information terminal in the embodiment of the present invention.

Next, explanation goes to a sequence diagram in FIG. 5. The CPU 51 instructs the controlling unit 50 to start the control (step S212), and then the controlling unit 50 initializes a timer of the clocking unit 40 (step S213). Subsequently the controlling unit starts the contents reproduction controlling operation according to the "script 2".

At first, the controlling unit instructs the image reproducing unit 25 to write the image (step S214), and then the image reading unit 26 acquires the image data from the image storing unit 27 (steps S215, S216). The image reproducing unit 25 outputs the acquired image data into the buffer connected to the superposing unit 70 (step S217), and notifies the controlling unit 50 of the write completion (step S218). When the controlling unit 50 instructs the superposing unit 70 to switch the image (step S219), the display of the LCD 91 is changed from the TV video of the sports broadcast shown in FIG. 5(a) to the image shown in FIG. 5(b).

Then, the controlling unit causes the clocking unit 40 to start a count of a predetermined time (step S220), and then instructs the moving picture reproducing unit 21 to standby the moving picture (step S221). The moving picture reading unit 22 acquires the moving picture from the moving picture storing unit 23 (steps S222, S223). The moving picture reproducing unit 21 outputs the acquired moving picture into the buffer connected to the superposing unit 70 (step S224), and notifies the controlling unit 50 of the standby completion (step S225).

Next, explanation goes to a sequence diagram in FIG. 6. The controlling unit 50 decreases a sound gain of the TV reproducing unit 11 stepwise in a predetermined timer period, and fades out the sound of the TV broadcast (steps S227 to S241). When the controlling unit 50 instructs the superposing unit 70 to switch the image (step S242) and also instructs the moving picture reproducing unit 21 to start the reproduction of the moving picture (step S243), the moving picture reproducing unit 21 starts the reproduction of the moving picture (step S244) and notifies the controlling unit 50 of the reproduction start (step S245). The display of the LCD 91 is changed from the image shown in FIG. 6(a) to the video shown in FIG. 6(b).

Next, explanation goes to a sequence diagram in FIG. 7. When the controlling unit 50 instructs the ringtone reproducing unit 31 to start the reproduction of the ringtone (step S247), the ringtone reading unit 32 acquires the ringtone data from the ringtone storing unit 33 (steps S248, S249). The ringtone reproducing unit 31 outputs the acquired ringtone data to the buffer connected to the superposing unit 70 (step S250), and also notifies the controlling unit 50 of the ringtone reproduction start (step S251).

Then, the controlling unit 50 gives the instruction as to the superposition balance of reproduced outputs among the TV reproducing unit 11, the moving picture reproducing unit 21, and the ringtone reproducing unit 31 to the superposing unit 70. In this situation, the output of the moving picture reproducing unit 21 is set to 100%. But subsequently the controlling unit 50 changes stepwise the balance of the reproduced outputs in a predetermined period, and cross fades the reproduced output from the contents of the moving picture reproducing unit 21 to the television broadcast of the TV reproducing unit 11 (steps S254 to S259).

Next, explanation goes to a sequence diagram in FIG. 8. The controlling unit 50 changes stepwise the superposition balance of the reproduced outputs in the same procedures as those in steps S254 to S259, and sets the output of the TV reproducing unit 11 to 100% finally (steps S260 to S266). Then, the controlling unit 50 stops the output of the moving picture reproducing unit 21 (steps S267, S268).

Therefore, on the display of the LCD 91, the contents reproduced video of the moving picture reproducing unit 21 shown in FIG. 7(a) fades out gradually as shown in FIG. 7(b), while the received video of the TV broadcast fades in. Also, the sounds of the TV broadcast and the ringtone fade in in the head set 92. In the state shown in FIG. 8(a), an output level of the ringtone is set to 100% and an output level of the TV broadcast is set to 50%.

Next, explanation goes to a sequence diagram in FIG. 9. When the user who knows the phone call pushes an off-hook key, the key input sensing unit 55 senses the key pushing (step S301). The CPU 51 notifies the controlling unit 50 of the key pushing (step S302), and then the controlling unit 50 causes the ringtone reproducing unit 31 to stop the reproduction (steps S303, S304). Also, the controlling unit 50 instructs the superposing unit 70 to set a gain of the speaking sound (step S305). In this state, the video of the TV broadcast is displayed on the LCD 91, and the sound in which the TV broadcast sound (50%) and the speaking sound (100%) are superposed is output into the head set 92.

Then, the user pushes the on-hook key after he or she ends the phone conversation, the key input sensing unit 55 senses the key pushing (step S401). The CPU 51 notifies the controlling unit 50 of the key pushing (step S402), and the controlling unit 50 turns off a gain setting of the speaking sound (step S403). Subsequently the controlling unit 50 increases stepwise gains of the received video and the sound of the TV broadcast in a predetermined period in the opposite procedures to those described above (steps S404 to S406).

Next, explanation goes to a sequence diagram in FIG. 10. The controlling unit 50 increases the gains in the same procedures as those in steps S404 to S406, so that both the video and sound reproduced outputs of the TV reproducing unit 11 are set to 100% finally (steps S407 to S415). With the above, the contents reproduction controlling operations performed when the phone call is sensed during the reproduction of the contents are ended. In the above sequence, the procedures set forth in step S212 to step S268 correspond to the "reproduced output control" process (step S105) in a flowchart in FIG. 2. Also, the procedures set forth in step S403 to step S415 correspond to the "reproduced output control" process in step S105.

Figure 14:
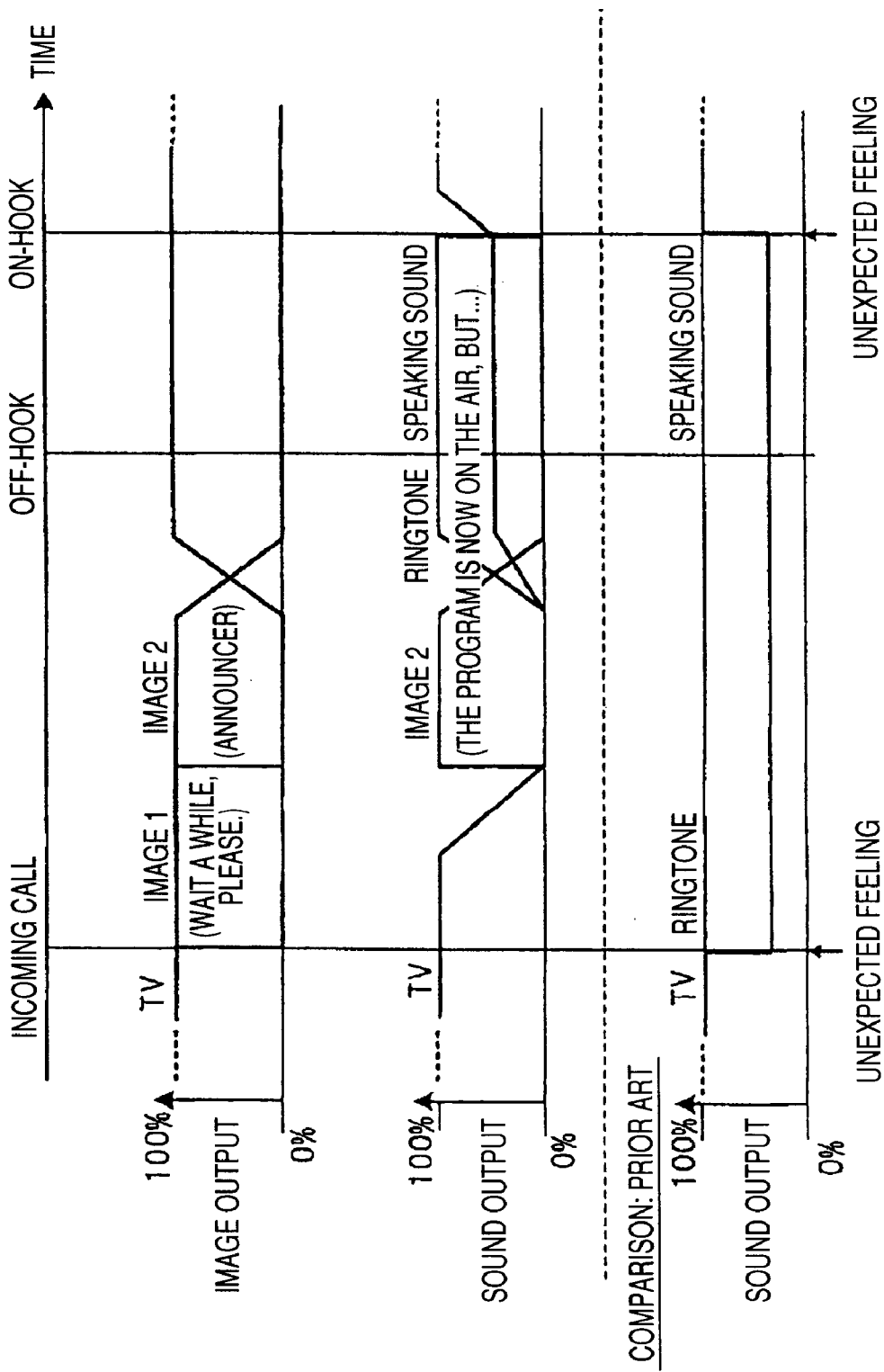
[FIG. 14] A timing chart showing contents of the contents reproduction controlling operation executed based on scenario information separately in terms of the video output and the sound output.
Figure 15:
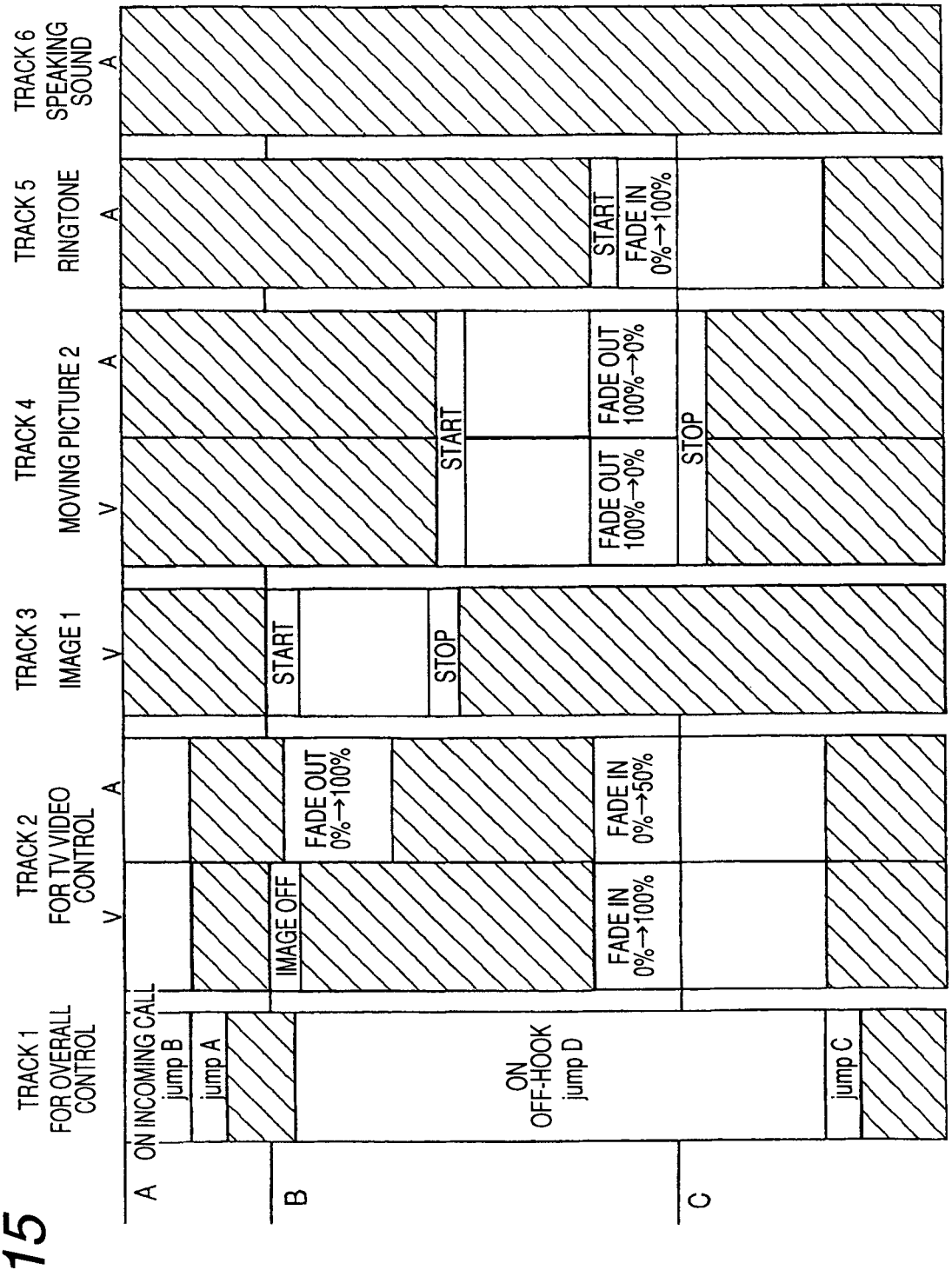
[FIG. 15] A timing chart showing contents of the contents reproduction controlling operation executed based on scenario information every control track.
Figure 16:
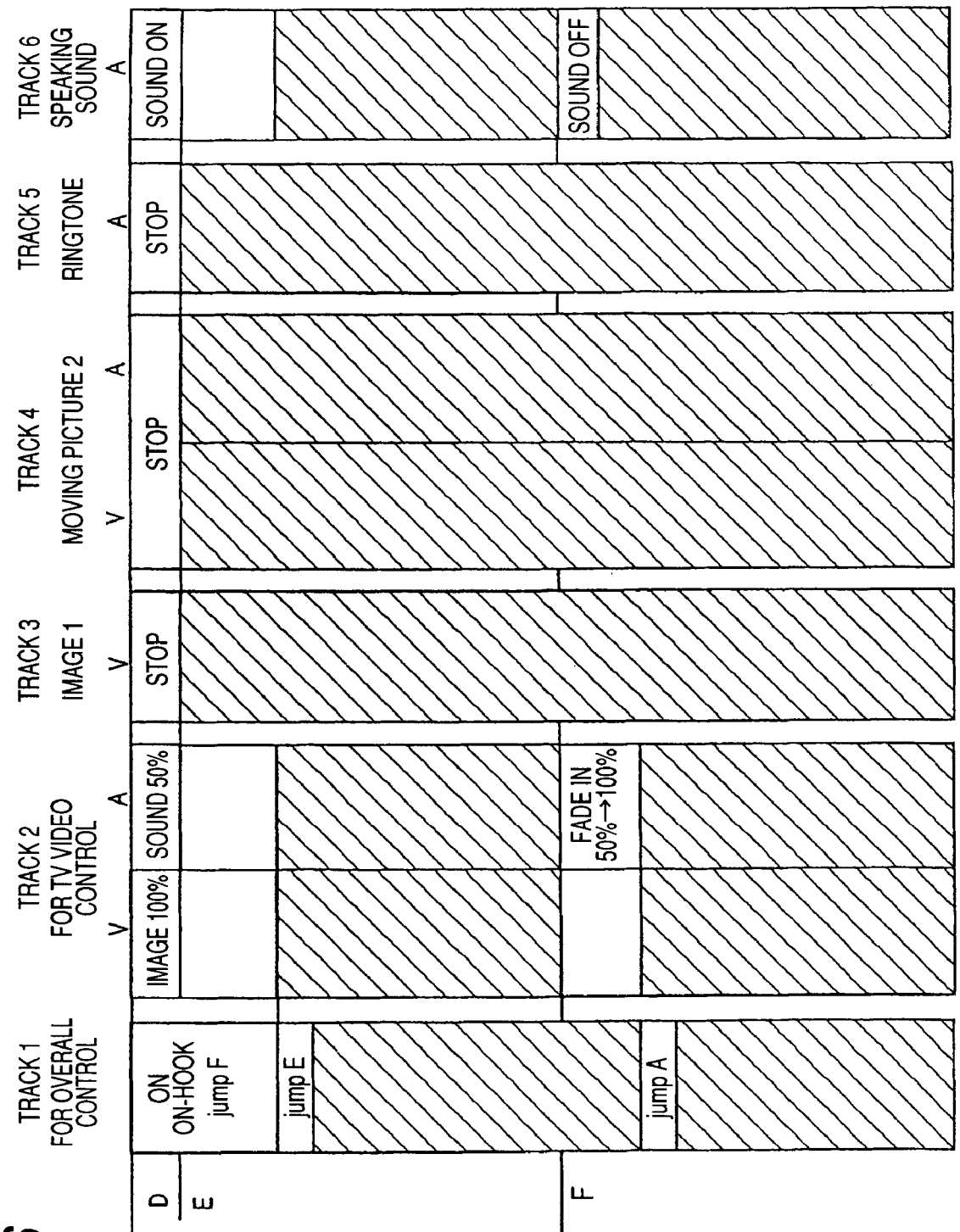
[FIG. 16] A timing chart showing contents of the contents reproduction controlling operation executed based on scenario information every control track.
Figure 17:
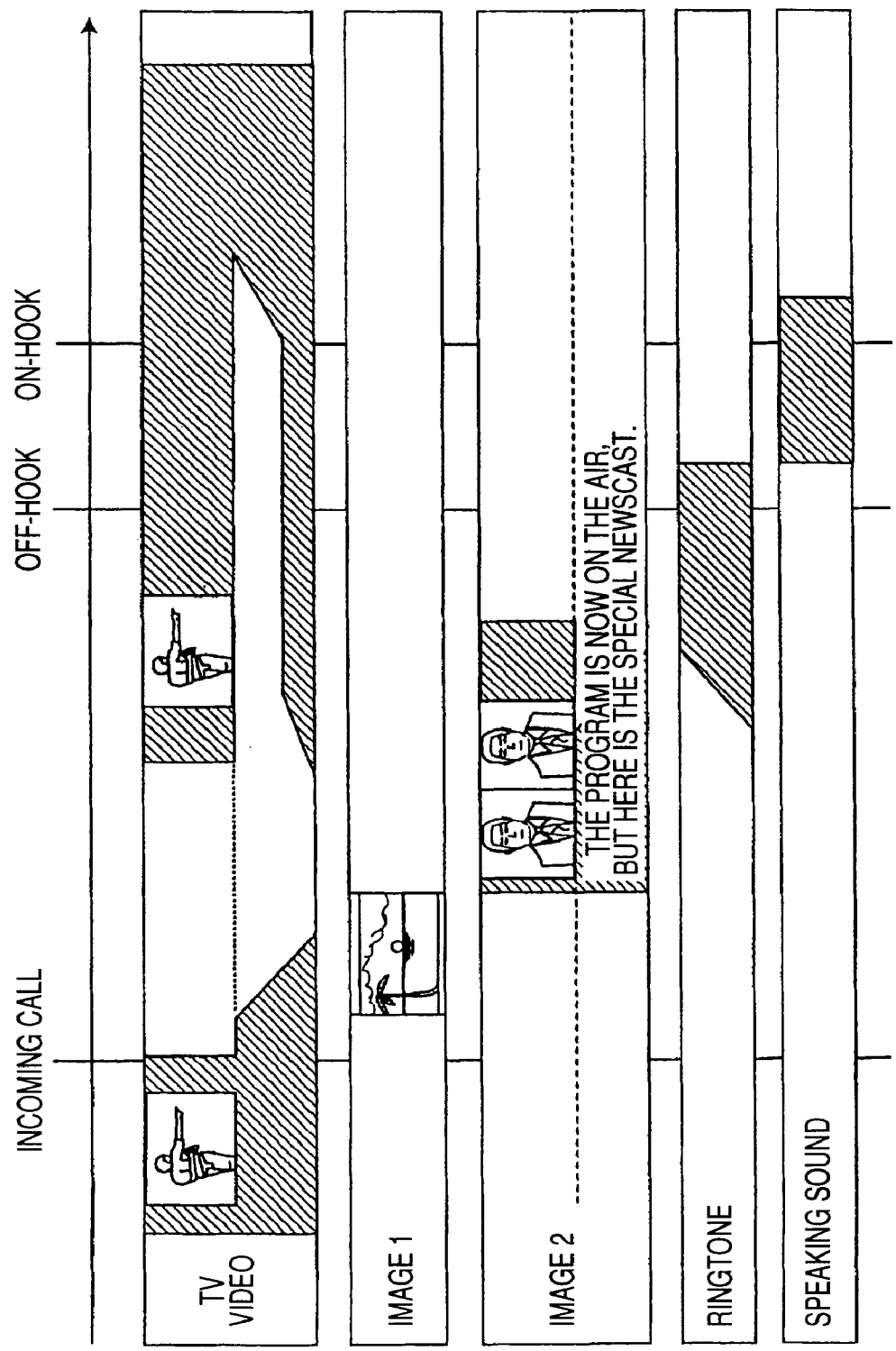
[FIG. 17] A view showing schematically respective changes of an image displayed on LCD and a sound level output to a head set on a timing chart until the on-hook is sensed after the phone call is sensed.

FIG. 14 is a timing chart showing contents of the contents reproduction controlling operation executed based on the scenario information described as the above "script 2" separately in terms of the video output and the sound output. Also, FIGS. 15 and 16 are timing charts showing contents of the contents reproduction controlling operation executed based on the scenario information described similarly as the "script 2" every control track. Also, FIG. 17 is a view showing schematically respective changes of an image displayed on LCD and a sound level output to a head set on a timing chart until the on-hook is sensed after the phone call is sensed. After the phone call comes in, the video of the TV broadcast on the display is transferred to the image and the moving picture to inform the incoming call, and the sound of the TV broadcast fades out and also the sound of the moving picture or the ringtone fades in. The speaking sound that has the maximum output during the conversation stops its output at the same time when the conversation is ended, and the sound of the TV broadcast fades in and is restored.

Figure 18:
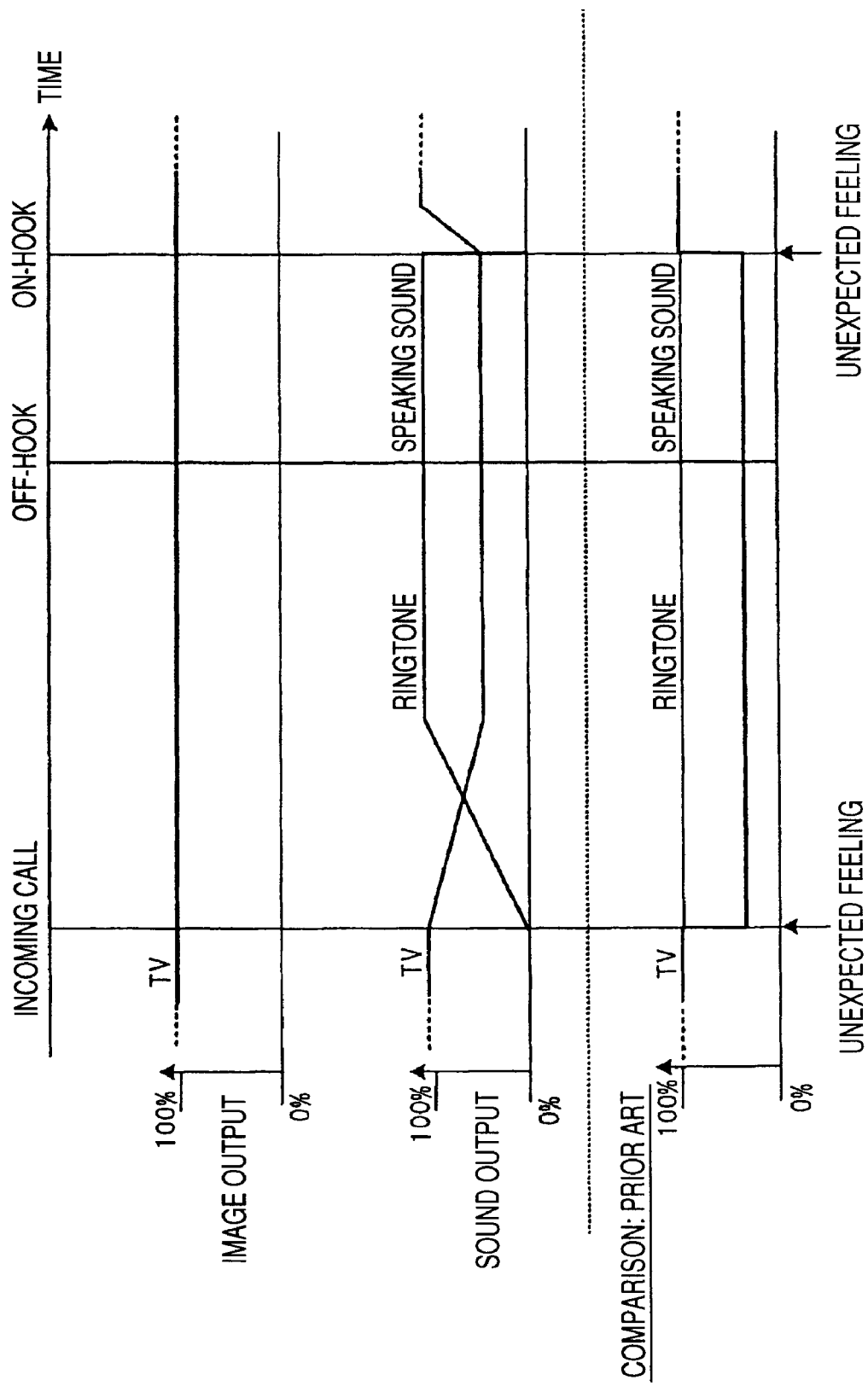
[FIG. 18] A timing chart showing contents of the contents reproduction controlling operation executed based on scenario information separately in terms of the video output and the sound output (informing contents are not reproduced).

By the way, when the scenario information by which the reproduction of the informing contents is not executed at a time of incoming of the phone call is selected, the video output and the sound output are given as shown in a timing chart shown in FIG. 18. In an example in FIG. 18, the video of the TV broadcast is output as it is after the phone call comes in, but the scenario is set such that the sounds of the TV broadcast and the ringtone cross fade. Therefore, unless the informing contents are not reproduced, an unexpected feeling caused at a time of incoming of the phone call can be reduced conspicuously rather than the prior art.

In the above embodiment, preferably the scenario information indicating the control procedures of the contents reproduction controlling operation should be added or updated by executing the download operation of the information terminal, reading the data from the removable media, or the like. In addition, infrared communication, Bluetooth communication, KIOSK terminal, TV data broadcast, and others may be utilized.

Also, in the above embodiment, an approach of executing a time management by strictly counting a time by a counter of the clocking unit is employed. In this case, instead of the clocking unit, a description to cause a time elapse may be inserted into the scenario information and then the contents of description may be executed sequentially by the controlling unit. Also, a description of time may be inserted into the scenario information and then the contents of description may be executed by the superposing unit. For example, the instruction having the contents "The TV sound fades out from 100% to 0% within 2 second." may be transferred from the controlling unit to the superposing unit, and then the superposing unit executes the instruction based on a clocking function built in the superposing unit.

Also, in the above embodiment, an approach of extracting the meta information from the character data contained in the contents being reproduced may be employed. In this case, such a configuration may be employed that the meta information contained in file name of the contents, file form time, file update time, file size, file type, file extension, file format, or file header, the meta information contained in another file, or the meta information acquired from the external system (network, broadcast, storage media, or the like) based on the above may be extracted.

Also, the selection of the scenario information is not limited to the case where the scenario information is selected based on the meta information. The scenario information may be selected based on the terminal condition (whether or not the TV broadcast is being reproduced, the music is being reproduced, the silent mode is turned ON/OFF, or the like) when the event takes place. Also, the meta information is limited to that extracted from the contents. The meta information may be selected based on the data that are corresponded to the contents (a picture recording start time contained in the picture recording setting information, a picture recording end time, a recording time, a recording channel, and the like). Also, the meta information may be selected based on the data contained the program guide information (EPG, and the like) used in the picture recording or acquired newly after the picture recording is started (program title, performer's name, program start time, end time, genre, detailed information, etc.).

Also, in the above embodiment, explanation is made by taking the case where the phone call is chosen as the sensed object of the event sensing unit by way of example. But this invention is not limited to this. A means for sensing electric mail arrival, TV phone arrival, instant message arrival, schedule alarm, warning of a remaining battery life, inside/outside cellphone service of the information terminal, or the like as the event may be employed.

In addition, as the search conditions applied to select the scenario information by the controlling procedure holding unit, season, past arrival number of times, cumulative speaking time, remaining battery life, acceleration applied to an information terminal casing, position information, atmospheric temperature, open/close state of a folding information terminal, longitudinal/lateral switch state of an LCD display, ON/OFF state of a silent mode, noise level of the periphery, application being reproduced, sound peak level/average power of the reproduced contents, presence/absence of the human voice, and the like may be set, in addition to the phone number of the sender of the phone, the group to which the sender belongs, and the call incoming time.

Also, as examples of variations of the informing contents, there may be considered the contents in which the event occurrence (phone call) is informed by the on-screen titles while sounding an informing sound of the news bulletin, the contents in which the knock sound and the moving picture to open the door are reproduced to fade in the phone screen and the phone melody, the contents in which the moving picture to slide the baseball player and the sound are reproduced to fade in the ringtone, the contents in which the information is repeated by a scratch sound that imitates a groove skipping of a record and a delay of sound, the contents in which a still picture, a speech, a moving picture (animation) are combined arbitrarily, and others.

The present invention is explained in detail with reference to particular embodiments, but it is apparent for those skilled in the art that various variations and modifications can be applied without departing a spirit and a scope of the present invention.

This application is based upon Japanese Patent Application (Patent Application No. 2004-247930) filed on Aug. 27, 2004; the contents of which are incorporated herein by reference.

INDUSTRIAL APPLICABILITY

The information terminal and the method of informing the event of the present invention have such an advantage that, since the reproduction of contents and the information of an occurrence of an event are carried out in previously set reproducing procedures, it is possible to inform the user of an occurrence of an event during the reproduction of contents without an unexpected feeling. As a result, the present invention is useful for controlling the contents reproducing operation, or the like when the event such as the phone call, or the like occurs while the contents are being reproduced.

The invention claimed is:

1. An information terminal, comprising:
    a reproducing unit that reproduces contents;
    an informing unit that informs an occurrence of an event;
    a superposing unit that superposes an output of the reproducing unit and an output of the informing unit; and
    a controlling unit that controls a timing of informing of the occurrence of the event and a timing of superposition of the output of the reproducing unit and the output of the informing unit in a predetermined reproducing procedure; and
    an extracting unit that extracts meta information from the contents to select the predetermined reproducing procedure from a plurality of reproducing procedures,
    wherein the controlling unit controls the timing of informing of the occurrence of the event and the timing of superposition of the output of the reproducing unit and the output of the informing unit in the predetermined reproducing procedure which is selected based on the meta information extracted by the extracting unit.

2. An information terminal, comprising:
    a reproducing unit that reproduces contents;
    an informing unit that informs an occurrence of an event;
    a superposing unit that superposes an output of the reproducing unit and an output of the informing unit; and
    a controlling unit that controls a timing of informing of the occurrence of the event and a timing of superposition of the output of the reproducing unit and the output of the informing unit in a predetermined reproducing procedure; and
    an acquiring unit that acquires meta information corresponded to the contents from contents data including at least one of character data contained in the contents, a file name of the contents, a file form time of the contents, a file update time of the contents, a file size of the contents, a file type of the contents, a file extension of the contents, a file format of the contents, and a file header of the contents, from an external system based on the contents data, or from either one of data contained in picture recording setting information, data contained in program guide information used in a picture recording, and data contained in program guide information acquired newly after the picture recording is started, wherein the controlling unit controls the timing of informing of the occurrence of the event and the timing of superposition of the output of the reproducing unit and the output of the informing unit in the predetermined reproducing procedure which is selected based on the meta information acquired by the acquiring unit.

3. A method of informing an event occurring in an information terminal including a reproducing unit that reproduces contents, an informing unit that informs an occurrence of an event, and a superposing unit that superposes an output of the reproducing unit and an output of the informing unit, the method comprising:
    controlling a timing of informing of the occurrence of the event and a timing of superposition of the output of the reproducing unit and the output of the informing unit in a predetermined reproducing procedure; and extracting meta information from the contents to select the predetermined reproducing procedure from a plurality of reproducing procedures, wherein in the controlling step, the timing of informing of the occurrence of the event and the timing of superposition of the output of the reproducing unit and the output of the informing unit are controlled in the predetermined reproducing procedure which is selected based on the meta information extracted in the extracting step.

4. A method of informing an event occurring in an information terminal including a reproducing unit that reproduces contents, an informing unit that informs an occurrence of an event, and a superposing unit that superposes an output of the reproducing unit and an output of the informing unit, the method comprising:

controlling a timing of informing of the occurrence of the event and a timing of superposition of the output of the reproducing unit and the output of the informing unit in a predetermined reproducing procedure; and acquiring meta information corresponded to the contents from contents data including at least one of character data contained in the contents, a file name of the contents, a file form time of the contents, a file update time of the contents, a file size of the contents, a file type of the contents, a file extension of the contents, a file format of the contents, and a file header of the contents, from an external system based on the contents data, or from either one of data contained in picture recording setting information, data contained in program guide information used in a picture recording, and data contained in program guide information acquired newly after the picture recording is started, wherein in the controlling step, the timing of informing of the occurrence of the event and the timing of superposition of the output of the reproducing unit and the output of the informing unit are controlled in the predetermined reproducing procedure which is selected based on the meta information acquired by the acquiring step.

* * * * *